United States Patent
Weiler et al.

(10) Patent No.: US 11,731,377 B2
(45) Date of Patent: Aug. 22, 2023

(54) METHOD AND DEVICE FOR PRODUCING WORKPIECES COMPRISING FIBER COMPOSITE MATERIAL

(71) Applicants: AZL Aachen GmbH, Aachen (DE); Rheinisch-Westfälische Technische Hochschule (RWTH) Aachen, Aachen (DE)

(72) Inventors: Thomas Weiler, Aachen (DE); Richard Schares, Aachen (DE); Albert Wendt, Aachen (DE); Lazlo Giesgen, Aachen (DE); Ruben Johannes Matthias Timmermanns, Aachen (DE)

(73) Assignees: AZL Aachen GmbH, Aachen (DE); RHEINISCH-WESTFÄLISCHE TECHNISCHE HOCHSCHULE (RWTH) AACHEN, Aachen (DE)

( * ) Notice: Subject to any disclaimer, the term of this patent is extended or adjusted under 35 U.S.C. 154(b) by 6 days.

(21) Appl. No.: 17/255,340

(22) PCT Filed: Jun. 25, 2019

(86) PCT No.: PCT/DE2019/100586
§ 371 (c)(1),
(2) Date: Dec. 22, 2020

(87) PCT Pub. No.: WO2020/001702
PCT Pub. Date: Jan. 2, 2020

(65) Prior Publication Data
US 2021/0260837 A1  Aug. 26, 2021

(30) Foreign Application Priority Data
Jun. 26, 2018  (DE) ..................... 10 2018 115 392.9

(51) Int. Cl.
*B29C 70/38* (2006.01)
*B29C 70/34* (2006.01)
(Continued)

(52) U.S. Cl.
CPC ............ *B29C 70/388* (2013.01); *B29C 70/34* (2013.01); *B29C 70/54* (2013.01); *B32B 38/1808* (2013.01)

(58) Field of Classification Search
CPC ............ B32B 38/1818; B32B 38/0004; B32B 38/1816; B32B 38/1808; B29C 70/388
See application file for complete search history.

(56) References Cited

U.S. PATENT DOCUMENTS

| | | | |
|---|---|---|---|
| 4,588,466 A * | 5/1986 | Eaton | .................... B29C 70/386 156/235 |
| 6,607,626 B2 | 8/2003 | Taggart | |

(Continued)

FOREIGN PATENT DOCUMENTS

| | | |
|---|---|---|
| CN | 107635755 | 1/2018 |
| DE | 102014201060 | 7/2015 |

(Continued)

OTHER PUBLICATIONS

International Search Report and Written Opinion for PCT/DE2019/100586, European Patent Office, dated Oct. 23, 2019.
(Continued)

*Primary Examiner* — Scott W Dodds
(74) *Attorney, Agent, or Firm* — Williams Mullen; Thomas F. Bergert

(57) ABSTRACT

In a method for producing workpieces comprising fibre composite material, in which a base unit (5) held by retaining means (97) of a conveying device is guided by at least one application station (2, 14, 17, 20, 23, 27, 29,2, 14, 17, 20, 23, 27, 29, 39-41, 67-72) and, in order to form the
(Continued)

Figure 1:
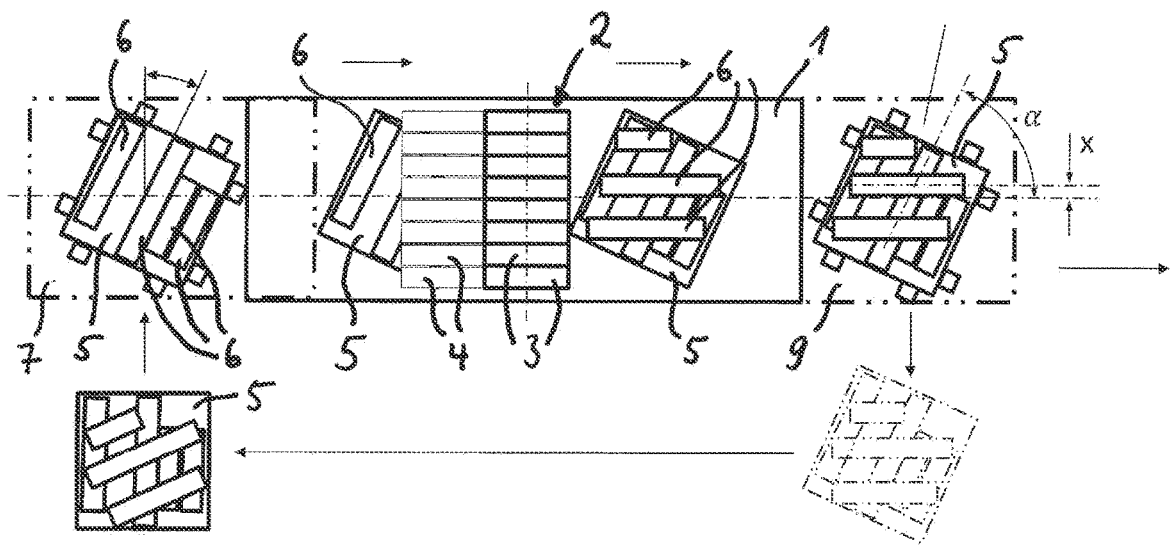

workpieces at the application station (2, 14, 17, 20, 23, 27, 29,2, 14, 17, 20, 23, 27, 29, 39-41, 67-72) or at least at one of the application stations (2, 14, 17, 20, 23, 27, 29,2, 14, 17, 20, 23, 27, 29, 39-41, 67-72), during a translational movement of the base unit (5) through the application station (2, 14, 17, 20, 23, 27, 29,2, 14, 17, 20, 23, 27, 29, 39-41, 67-72) in question at least one strip (6) belonging to the fibre composite material is placed on the base unit (5), it is proposed that the spatial orientation of the base unit (5) is altered by means of at least one rotation relative to the retaining means (97) before the application station (2, 14, 17, 20, 23, 27, 29,2, 14, 17, 20, 23, 27, 29, 39-41, 67-72) or before at least one of the application stations (2, 14, 17, 20, 23, 27, 29,2, 14, 17, 20, 23, 27, 29, 39-41, 67-72) in the conveying direction. The invention furthermore relates to an apparatus suitable therefor.

12 Claims, 7 Drawing Sheets

(51) Int. Cl.
*B29C 70/54* (2006.01)
*B32B 38/18* (2006.01)

(56) References Cited

U.S. PATENT DOCUMENTS

| | | | |
|---|---|---|---|
| 8,048,253 B2 | 11/2011 | Cramer et al. | |
| 8,919,410 B2* | 12/2014 | Kappesser | B29C 70/38 |
| | | | 156/538 |
| 9,399,338 B1* | 7/2016 | Metschan | B32B 37/02 |
| 2017/0080647 A1* | 3/2017 | Benson | B29C 66/8362 |
| 2018/0036966 A1* | 2/2018 | Boge | B29C 70/34 |

FOREIGN PATENT DOCUMENTS

| | | |
|---|---|---|
| DE | 102016104926 | 9/2017 |
| DE | 202016105889 | 1/2018 |
| EP | 1422048 | 5/2004 |
| EP | 2925509 | 10/2015 |
| WO | 9620824 | 7/1996 |
| WO | 2017127276 | 7/2017 |

OTHER PUBLICATIONS

Fill Gesellschaft M.B.H., The Efficient Laying System—Multilayer, https://www.fill.co.at/de/automotivekunststofftechnik/composites/fiber-&-preforming/multilayer/video/1358p572i30.html, Jun. 22, 2018.
Chinese Office Action for CN Application No. 201980043870.8, China National Intellectual Property Administration, dated Mar. 2, 2022.

* cited by examiner

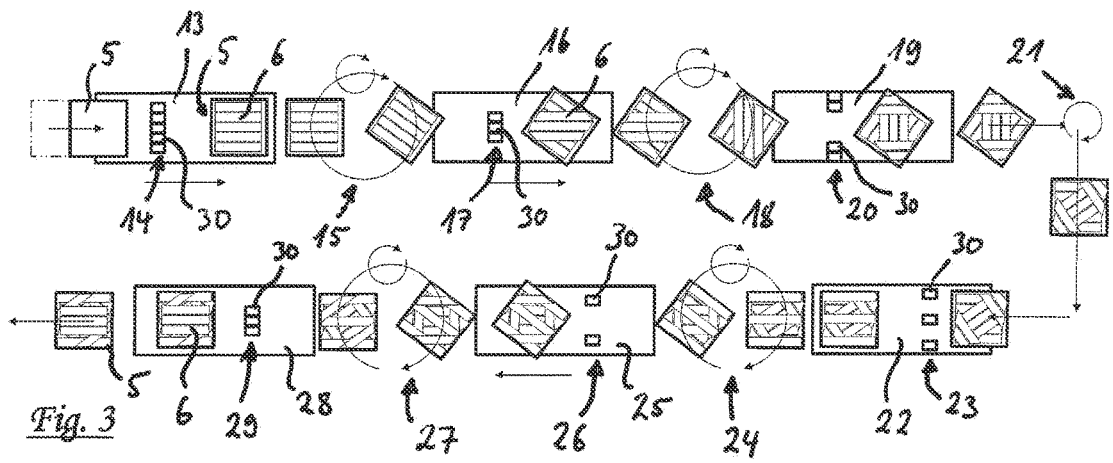
Fig. 3
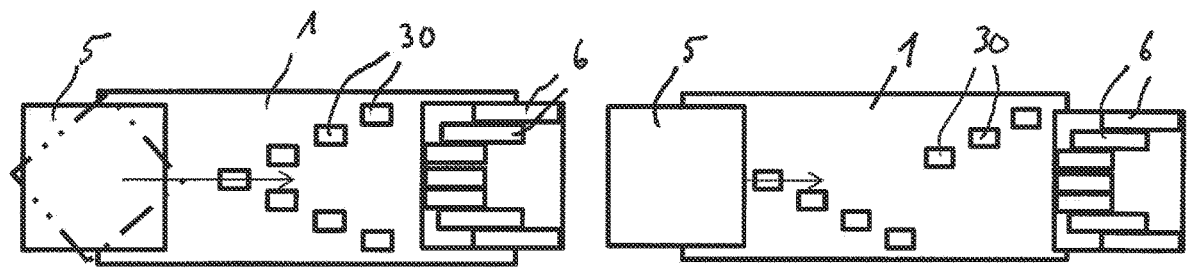
Fig. 4    Fig. 5
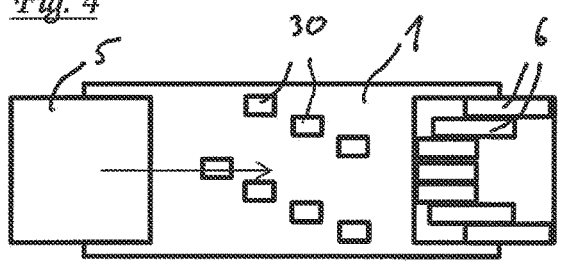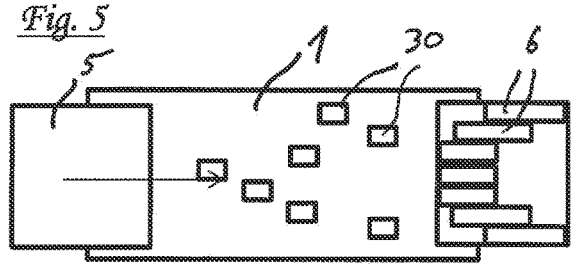
Fig. 6    Fig. 7
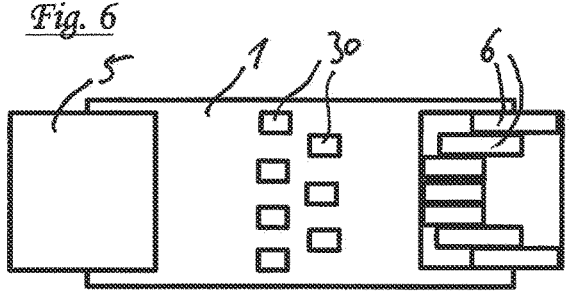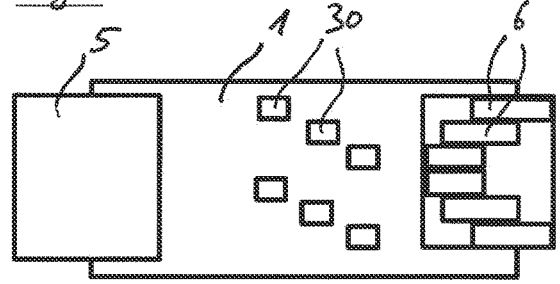
Fig. 8    Fig. 9

METHOD AND DEVICE FOR PRODUCING WORKPIECES COMPRISING FIBER COMPOSITE MATERIAL

CROSS-REFERENCE TO RELATED APPLICATIONS

This application is the U.S. national phase of international application PCT/DE2019/100586, filed on Jun. 25, 2019, which claims the benefit of German application DE 10 2018 115 392.9 filed on Jun. 26, 2018; all of which are hereby incorporated herein in their entirety by reference.

High performance fiber composite components have become established in many fields of application, for example in the aerospace industry, said components being particularly suitable wherever a low weight at simultaneously high mechanical load-bearing capacity is required. The high performance fiber composite components can be produced by laying endless fiber-reinforced strips, also called tapes. The reinforcing fibers can be present for example in the form of yarns, woven fabric or laid scrims and can be composed of carbon, glass or other natural or synthetically produced materials. The fibers are secured in the strips and/or are embedded in a plastics matrix which is composed, for example, of a thermoplastic or thermosetting plastic. If the strips are already at least substantially embedded in the plastics matrix before laying on the workpiece or on a substrate, they are also referred to as prepregs (preimpregnated fibers). Prepregs prior to deposition can be provided on their deposition side with an attaching material, for example a reactive hot-melt adhesive, and/or can lie on a backing material which is removed before the strips are laid. It is also possible to lay and secure dry fibers in order to subsequently impregnate them and/or encase them with a plastics matrix, and therefore the finished strip is produced virtually as it is being deposited. Examples of a securing medium for dry fibers can include binders, hot-melt filaments or stitching.

For the production of the workpieces, strips are advanced or drawn forward mechanically, pressed onto a substrate and laid in an automated manner. The strips can be cut to the desired length before or during the deposition. In order to produce planar components, a plurality of strips are laid at a defined distance, for example abutting one another, overlapping one another or at a distance from one another. The lowermost layer of the fiber composite material can be laid onto a substrate which subsequently is part of the finished workpiece or which is removed again. The thickness of the component is produced by laying a plurality of layers one above another, optionally also with different fiber orientations, in order to meet stipulations in respect of the laminate construction. In this way, local component reinforcements or preferred directions can also be achieved and local workpiece regions left out. Material costs in the component can therefore be reduced.

The cost-efficient scaling of the application rate of the processes for producing workpieces comprising fiber composite material is a central aspect of the development so as to be able to increase the economically expedient fields of use because of an associated reduction in costs.

U.S. Pat. No. 6,607,626 B2 discloses a method and a device of the type mentioned at the beginning. For the production of workpieces comprising fiber composite material, for example body parts of vehicles, it is disclosed there to supply a base unit on a conveyor belt successively to a plurality of application stations at which the fiber composite material is in each case applied in the form of strips to the respective base unit. A plurality of layers lying one above another of the fiber composite material thereby arise. The application stations each have a plurality of laying heads for the strip material that is to be laid. The laying heads are arranged on a common carrier unit which is movable transversely with respect to the conveying direction of the conveyor belt. In addition, the laying heads each have a strip guiding element which is rotatable about an axis perpendicular to the conveying plane. The orientation of the strips that are to be laid can thus be changed relative to the conveying direction such that, by means of the transverse movement of the carrier unit during the strip deposition, different laying directions of the strips relative to the conveying direction can be provided in the various application stations. The rotational movements of the strip guiding elements have to be coordinated with the transverse movement of the carrier unit in order to achieve the desired orientation of the strips that are to be laid. In addition, the variation of the possible laying directions on the base unit is limited. The acceleration of large masses in the transverse direction limits the plant dynamics and thus the laying speed particularly in the case of large laying angles. The transverse movement causes a spatially changing process zone. This makes it difficult to provide safety devices and quality assurance devices.

EP 2 925 509 B1 discloses a tape laying device with a laying table movable in a rotational and translation manner. In a variant of this prior art, in a single laying head unit, two strips can be pulled off successively from different material supply units, cut to the appropriate length and laid onto the laying table, which is placed at a suitable location. In order to secure the laid strips, a strip attaching unit is provided which, according to the drawings, comprises a multiplicity of individual devices arranged in series, probably ultrasonic sonotrodes. In a variant having two laying head units that are accessible for a common laying table, the laying head units are independent of one another and each have a dedicated material supply unit, a cutting device, gripping means for the strips and an associated linear drive for each gripping means, guideways for the respective strip that is to be laid and a strip attaching unit. In this configuration, a strip section can be pulled to length, positioned in guideways and attached by the first laying head unit in position on the part that is to be produced while at the same time the next strip section is pulled to length and positioned in the guideways on the second laying head unit. After the first strip section has been attached by the first laying head unit, the laying table conveys the part that is to be produced to the second laying head unit while the next strip section is prepared and brought into position in order to be attached to the part that is to be produced. Accordingly, in each case only one strip is laid and attached at a certain time. The movement of the laying table and of the actuator mechanism located on the laying table required according to this prior art signify a movement of relatively large masses in relation to the strip masses thus applied. In addition, by use of a strip attaching unit, clearly in the form of ultrasonic sonotrodes, the strips after being laid are in each case subsequently attached individually, which requires a retrospective consolidation of the laminate produced by the strips before further processing.

DE 20 2016 105 889 U1 discloses a further device for producing workpieces comprising fiber composite material, in which fiber composite material strips are laid by means of an application station onto a laying table which is movable in a rotational and translational manner. The workpieces that are to be produced are secured on a tabletop of the laying table by means of negative pressure. For the application of a plurality of layers the table is moved repeatedly under the application station and rotated when required in order to permit different laying directions for the strips. Each strip is laid individually here. For supplying the strip, a buffer system is disclosed which can be designed, for example, as a dancer system, and keeps a strip supply ready, permitting a strip supply to be exchanged without having to interrupt the production process. In addition, the buffer system can serve to permit the stopping operation, which is required for cutting the strip to the desired laying length, in the region of the blades without interrupting a continuous unwinding of the strip from the supply. Furthermore, it is disclosed to supply the strip material to the laying process as strips that have already been cut to size. A cutting process can thereby be dispensed with. For the laying process, the strips that have been cut to size are transported suspended by means of negative pressure in the laying head. It is also disclosed to lay a plurality of strips simultaneously. The laid strips are secured by means of attaching devices using ultrasound. The disadvantages already mentioned with regard to EP 2 925 509 B1 likewise arise here, and this also applies to the following prior art.

U.S. Pat. No. 8,048,253 B2 describes a tape laying device which, in a variant, has a plurality of laying heads such that it becomes possible to lay a plurality of tapes or tape strips simultaneously. The strip material is supplied to a cutting device, which cuts a strip to the desired length, and is subsequently placed by the associated laying unit onto the processing surface of a laying table which is movable in a translational manner in two directions of a displacement plane and can be rotated about an axis of rotation oriented perpendicularly to the displacement plane. The cut strip is guided in the laying head in each case in guide rails which are arranged on both sides of the strip, wherein edges of the strip are held in grooves of the guide rails. The strips are secured by means of ultrasonic sonotrodes.

Furthermore, a variant of a strip laying device for producing workpieces comprising fiber composite material, with a rotatable laying table movable in a translation manner is known (https://www.fill.co.at/de/automotive kunststofftechnik/composites/fiber-&-preforming/multilayer/video/1358p572i30.html; Jun. 22, 2018) in which the laying table is placed in a desired orientation under an array of laying units which are arranged parallel to one another and are movable relative to one another. When the laying table is stationary, the laying units are moved in groups or individually, the table is subsequently moved in a translational and/or rotational manner, and is moved again in a new orientation under the laying unit array. If the laying pattern differs from layer to layer of the strips, it may be necessary for only some of the laying units to be used in a certain layer. Depending on the laying pattern, the laying units may have lengthy shutdown periods. This results in an unused investment and also in high machine complexity with respect to the construction space, in particular because of a high need for linear actuator mechanisms for the laying units, namely in each case one per laying unit. Large moving masses occur also with this machine principle.

DE 10 2014 201 060 A1 discloses a fiber laying installation, in which a plurality of application stations, called fiber laying machines there, are connected to a conveyor device. The fiber laying installation has a receiving point, from which retaining means for base units, called pallets for molds in the abovementioned publication, are transported to the application stations by means of a conveyor carriage. In the input region of the respective application station, the respective retaining means is placed by means of a handling unit onto a tool table of a carriage which is movable in the X direction and is subsequently moved within a laying chamber, which is closable by doors, under a laying head. In the laying chamber, the laying head can be moved in the Y direction and vertically while the carriage remains movable in the X direction and the tool table is rotatable. Movement of the table in the X direction during the strip laying is also disclosed. Three-dimensional base units (molds) can therefore be covered with strips within the closed laying chamber.

WO 2017/127276 A1 discloses an individual application station through which a laying table, which is rotatable about its vertical axis, is guided back and forth on a conveyor device. The starting point is that, before the laying of the strips, the laying table is rotated in the desired orientation and the laying unit for laying the strips is moved in a translational manner in a direction perpendicular to the conveying direction of the conveyor device. The strips are thus laid when the laying table is at a standstill and in the application station with the moving laying unit.

EP 1 422 048 A2 discloses a bridge-shaped laying unit which is movable with respect to stationary workpieces and has a multiplicity of laying heads. The laying heads are arranged offset on both sides of the bridge crosspiece in such a manner that gap-free laying is possible, but, for this purpose, two movement operations of the laying unit in opposite directions are provided.

DE 10 2016 104 926 A1 discloses a complex machine in which strip material removed from a reel is first of all cut to size and then supplied to a laying unit via narrow conveyor belts. Laying heads use a vacuum to pick up the strip pieces that have been cut to size, and guide the latter to a laying table where they are laid. If a sufficient number of strips are laid in a first layer, the laid layer is picked up by a transport unit and laid on a further table. Said second table is rotated in order then to be able to lay a further laid on the first laying table onto the first layer with the desired orientation.

The invention of concern here is based on the technical object of providing a method and a device of the type mentioned at the beginning that can be more economical than the prior art, for example by reducing moving masses in relation to the laid strip quantity and minimizing the shutdown periods of laying units.

The technical object is achieved in respect of the method by the characterizing features of claim 1 and in respect of the device by the characterizing features of claim 13.

Advantageous embodiments of the method according to the invention and of the device according to the invention emerge from the dependent claims.

Accordingly, in respect of a method for producing workpieces comprising fiber composite material, in which a base unit held by retaining means of a conveyor device is guided through at least one application station, and in order to form the workpieces at the application station, or at least one of the application stations during a translational movement of the base unit through the application station in question, at least one strip belonging to the fiber composite material is laid onto the base unit, it is proposed that the spatial orientation of the base unit is changed by means of at least one rotation relative to the retaining means in the conveying direction upstream of the application station or upstream of at least one of the application stations.

Laying of a strip within the meaning of the invention is understood as meaning both laying of a prepreg and laying of fiber material which is impregnated with a binder and/or surrounded by a plastics matrix only immediately before, during or immediately after laying.

The laying of a strip onto the base unit means both applying a first layer on the base unit and applying a further layer on at least one layer that is already present of laid strips.

The term base unit within the meaning of the invention should be understood as meaning both a free main base unit that is not yet covered with strip material, for example a carrier element, a substrate, an organosheet, a textile material or a plastics sheet, and also a main base unit on which strip material has already been laid to provide the finished workpiece. The main base unit can become part of the finished workpiece or else can be separated, preferably reusably, from the applied workpiece.

However, a base unit is intended also to be understood as meaning a first layer with at least one strip not laid on a main base unit. Such a first strip layer can be laid, for example, directly onto the retaining means of the conveyor device. Said retaining means are not part of a base unit.

The term strip material is understood as meaning both a premanufactured strip (prepreg) with reinforcing fibers and a binder and/or plastics matrix and also fiber material which originates from a supply roll, is already pre-impregnated or is not impregnated and is completed to form the finished strip possibly only shortly before being laid, during the laying or directly after being laid. If it is stated that a strip is formed with the strip material, this thus means that the formation of a strip is provided solely by laying the corresponding strip material piece in the base unit or by adding further material, for example the plastics matrix. Pre-impregnated strips can occur in different thicknesses, widths and fiber volume ratios.

The conveyor device can have, for example, driven friction transport belts, roller conveyors, ball tracks, vacuum belts, magnetic carriages and/or trolleys with a linear drive. The conveyor device can consist of a plurality of partial conveyor devices, and therefore the overall conveyor device can be arranged or assembled in different configurations.

Full automation of the production method is possible with the method according to the invention and the device according to the invention. The change in direction takes place outside the application station(s), with it being possible for the orientation unit to preferably be considered part of the conveyor device. With the change in the orientation of the base unit relative to the retaining means carrying the latter, a potentially economically substantially more effective alternative to the solution known from the prior art with a laying table which is movable in a translational and rotational manner is provided. The change in the orientation of the base unit relative to the retaining means signifies a substantially lower mass that is to be moved with respect to the quantity of strip material that is to be laid. In addition, it is avoided that laying units have to have additional, complicated, robot-guided movement actuator mechanisms for laying strips. Since movable laying units can be dispensed with in the region of the application stations, a static process zone can be set up there, and therefore local protective housings, process sensor arrangements, additional processes and the endless supplying of the strip material can be realized cost-effectively.

For the change in orientation, an orientation unit can be supplied to the base unit from above, i.e. in the direction of gravitational force, and can grip, for example, by use of vacuum or in some other way. Alternatively, the orientation unit can grip the base unit from below, i.e. through the conveying plane. The grasping or securing of the base unit by the orientation unit can be assisted in this case by gravitational force and, if required, reinforced by additional technical features. For example, at least one abutting edge, which is preferably provided on the conveyor device, and conveyor elements running at different speeds, for example belts, chutes or drop pits, also come into consideration for changing the orientation.

However, the orientation unit can also be configured for stacking a plurality of base units. It is conceivable here that, for changing the orientation of the base unit lying uppermost, the entire stack of base units is changed in orientation, preferably rotated. The stack can serve as a buffer for the processing process.

The change in orientation can be, for example, a rotation about an axis of rotation oriented perpendicular to a conveying plane, wherein the base unit is conveyed parallel to the conveying plane, for example resting directly or indirectly on the conveying plane. However, differently oriented orientation axes of rotation are alternatively or additionally also possible, for example in order to turn the base unit.

The method according to the invention can also be designed in such a manner that the change in orientation takes place while the base unit is being conveyed on the conveyor device. In this case, the orientation unit would move together with the base unit or with a stack of base units in the conveying direction. An actuator mechanism for changing the orientation can be carried along by the conveyor device. The orientation unit can also be considered to be part of the conveyor device. However, access to the base unit by a unit moving in addition to the conveyor device is also conceivable.

Of course, the change in orientation can also be carried out during stoppage of a conveyor, irrespective of whether the actuators for changing the orientation are carried along or are not carried along by the conveyor device.

The first layer consisting of at least one strip can be laid directly onto an element of the conveyor device, for example onto the retaining means of the conveyor device, and therefore a base unit is produced for the deposition of at least one further layer. However, the method according to the invention can also be designed in such a manner that a first layer consisting of at least one strip is laid onto a main base unit not belonging to the conveyor device, for example onto a workpiece carrier. The entirety of main base unit and laid first layer then forms the base unit for the further procedure.

Furthermore, the method according to the invention can be designed in such a manner that the base unit in the conveyor device is acted upon with heat at least also outside the at least one application station. This can be carried out by means of at least one tempering unit arranged along the conveyor device. By this means, an outlay for heating the base unit in the application station following downstream of the tempering measure in the conveying direction can be avoided or reduced. In addition, possibly damaging temperature fluctuations of the at least one base unit can thereby be avoided. It can be advantageous here to use a main base unit or a separate carrier unit for the base unit that has a high coefficient of heat transfer with respect to the at least one laid strip and furthermore preferably has low heat conductivity.

Furthermore, the method according to the invention can be designed in such a manner that strip material for forming the at least one strip is kept ready in at least one supply container. In this case, it can be particularly advantageous if at least one of the application stations at least two of the supply containers are loaded with strip material in such a manner that, during a planned strip deposition with a predetermined laying pattern, said supply containers are exhausted simultaneously or at least approximately simultaneously. This has the great economical advantage that the supply containers which are involved can be interchanged simultaneously without a considerable residue of the strip material remaining in at least one of the supply containers. A supply container can be, for example, a reel or a roll with coiled strip material or a magazine with, for example, stacked strip material or strip material in a meandering convolution.

Furthermore, the method according to the invention can be designed in such a manner that before a first of the supply containers is replaced by a second of the supply containers, the strip material of the second supply container is joined to the strip material of the first supply container. The joining can take place manually or preferably in an automated process. The effect which can be achieved by this is that, even when a supply container is being interchanged, the production process can be continued without interruption or has to be interrupted only for a relatively short period. It can be provided here that the strip material is guided via a buffer zone, for example with a dancer system.

The method according to the invention can also be designed in such a manner that, by means of the introduction of predetermined separating points, at least a partial quantity of the strip material is divided into strip material sections which are easily separable from one another and the respective length of which corresponds precisely or at least substantially to the length of the strip to be formed therewith. A separate cutting process can thereby be avoided. The predetermined separating points can be introduced, for example, by a perforation or partial severing of the strip material in the width direction, by cutting the ends of consecutive strip material pieces by means of adhering coupling pieces or by attaching the mutually overlapping ends of the consecutive strip material pieces to one another or by securing strip material pieces that have been separated from one another on a backing film. The separation at the predetermined separating points can be achieved depending on the type of predetermined separating points, for example by simply peeling off the backing film, by pulling or by introducing heat or radiation, in particular laser radiation, and therefore a cutting device, in particular such a device with mechanical blades, can be spared.

The method according to the invention can also be designed in such a manner that at least one of the application stations for laying the strip or at least one of the strips, the associated strip material is pressed against the base unit by a respective pressure element of a laying unit. This preferably takes place by means of at least one stationary laying unit under which the base unit is guided.

It can also be provided that before the strip material is pressed against the base unit, the strip material is acted upon from a region spaced apart from the pressure element in the pressure direction of the pressure element, in particular the strip material is pre-positioned, pretreated, in particular preheated, and/or attached to the pressure element in question before contact with the base unit. In the event of conveying of the base units on a conveying plane which is horizontal in the field of gravity, the action upon the strip material thus takes place from a region below the conveying plane. For this purpose, the conveyor device should be configured to be at least temporarily correspondingly open in the region of the respective pressure element. The pretreatment can also, for example, be the application of an adhesive. If attaching is desired, this is intended to take place as far as possible in such a manner that, upon contact of the pressure element with the base unit conveyed by the conveyor device, the beginning of the strip material piece makes precise contact with the base unit at the point at which the strip that is to be laid is intended to begin according to the predetermined laying pattern. Retrospective cutting or removal processes can thus be avoided.

The method according to the invention can also be designed in such a manner that the pressure element is cooled by means of a cooling fluid flowing through the pressure element, for example a pressure-exerting roller. The pressure element can also be designed, for example, as a pressure bead or sliding block. With the cooling, effective protection for the material of the pressure element in question is provided.

The device according to the invention can advantageously be designed in such a manner that at least one pressure element arranged at the laying unit or at one of the laying units is cooled by means of a cooling fluid, wherein the pressure element is a pressure-exerting roller mounted on a stationary axle secured in a roller holder, wherein the pressure-exerting roller comprises a casing element, which is provided for contact with the strip material, and at least part of a cooling fluid line runs between the axle and the casing element or is formed by at least one chamber arranged between casing element and axle. It can be particularly advantageous here if the mounting of the pressure-exerting roller is arranged within a working width of the pressure-exerting roller. In addition, the cooling fluid can be guided directly into the fixed axle via the roller holder, and therefore an inherent rotary leadthrough is provided. Seals required for the guiding of the cooling fluid can thereby likewise be arranged within the working width of the pressure-exerting roller.

By means of this arrangement, it is possible to arrange mutually adjacent laying units on one another in such a tight way that the strips can be laid simultaneously with only a small lateral distance from one another. It can also be provided here that the cooling fluid is supplied by means of the roller holder, for example by means of arms of a lever element, and therefore no separate supply elements that increase the width of the laying unit, for example a rotary leadthrough outside the working width, are required.

The method according to the invention can also be designed in such a manner that at least two base units are conveyed simultaneously in the conveyor device, and the at least two base units are guided successively through at least two application stations, wherein preferably different laying patterns for the strip or the strips are provided at least two of the application stations. Preferably, at a certain time, a multiplicity of base units are located in the conveyor device and all pass successively through the application stations. The laying patterns in the application stations are preferably predetermined solely by the fixed position of the at least one laying unit located therein and the dimensions of the respectively laid strip material. The orientation of the laying pattern provided in a certain application station on the base unit is predetermined by the orientation of the base unit in space and therefore relative to the application station and by the conveying direction and can be influenced by a possible change in orientation with the orientation unit.

The laying patterns can be planned here in the application stations in such a manner that all of the laying units present in the application stations are involved in the strip deposition during the passage of a base unit. In addition, it is possible for clocking in the conveying of the base units to be set, with which at least one base unit is present at any time in or upstream of the application station, and therefore optimized utilization of the laying units and therefore of the shutdown periods of the laying units can be achieved.

The division of the laying units into a plurality of application stations also has the advantage that the deposition of strips of differing width is facilitated, in particular in different strip layers. The deposition of wider strips can increase the cost effectiveness of the production method. Also, very small strip laying widths can minimize the waste at the edge of the workpiece. Providing different strip laying widths would be problematic for example in the prior art that provides a rotatable laying table for moving below a single application station.

Overall, a high workpiece throughput can be achieved with relatively low investment and operating costs. In addition, in the application stations that are preferably fixedly installed in space, the laying units and the means for supplying strips can be configured so as to be easily interchangeable, and therefore the respective laying pattern can be simply changed. Application-specific configurations can thus easily be realized.

The device according to the invention can also be designed in such a manner that the application station or at least one of the application stations has at least two laying units which are stationary in the production process, wherein laying sites of the laying units are arranged at a distance from one another in the conveying direction. Stationary means that the laying unit is not changed in its position relative to the application station. The distance in the conveying direction only facilitates or makes possible lateral access, i.e. access required transversely with respect to the conveying direction, for repair, maintenance or interchanging of a laying unit or of parts thereof. Furthermore, the distance in the conveying direction can be configured in such a manner that the distances between the laying units in the laying surface perpendicular to the conveying direction correspond to the widths of the strips that are to be laid. That is to say, in a single pass, a cohesive surface of the laid strips can be achieved. The working widths of adjacent laying units of the same application unit can thus directly adjoin one another.

The measures depicted in the claims and in the associated description can basically also be carried out without the characterizing features of the independent claims, i.e. without changing the orientation of the base unit and without an orientation unit, and can be considered inventive as seen by themselves.

Exemplary embodiments of the device according to the invention and of the method according to the invention are explained below with reference to figures.

In the figures, schematically

Figure 2:
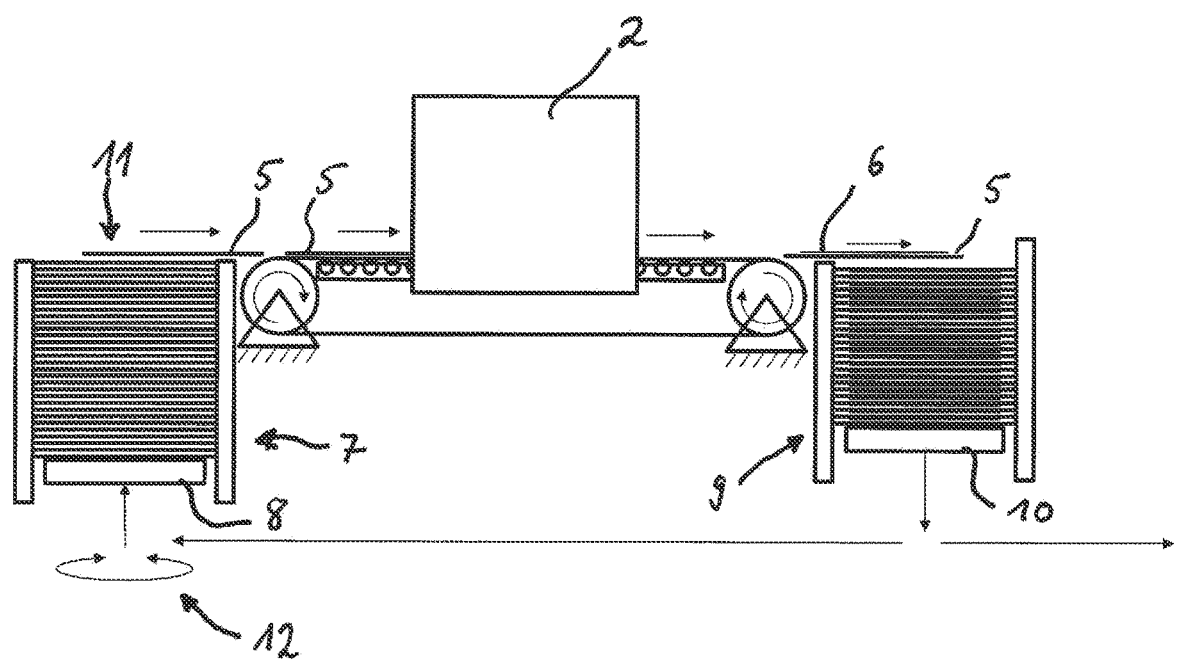
Figure 10:
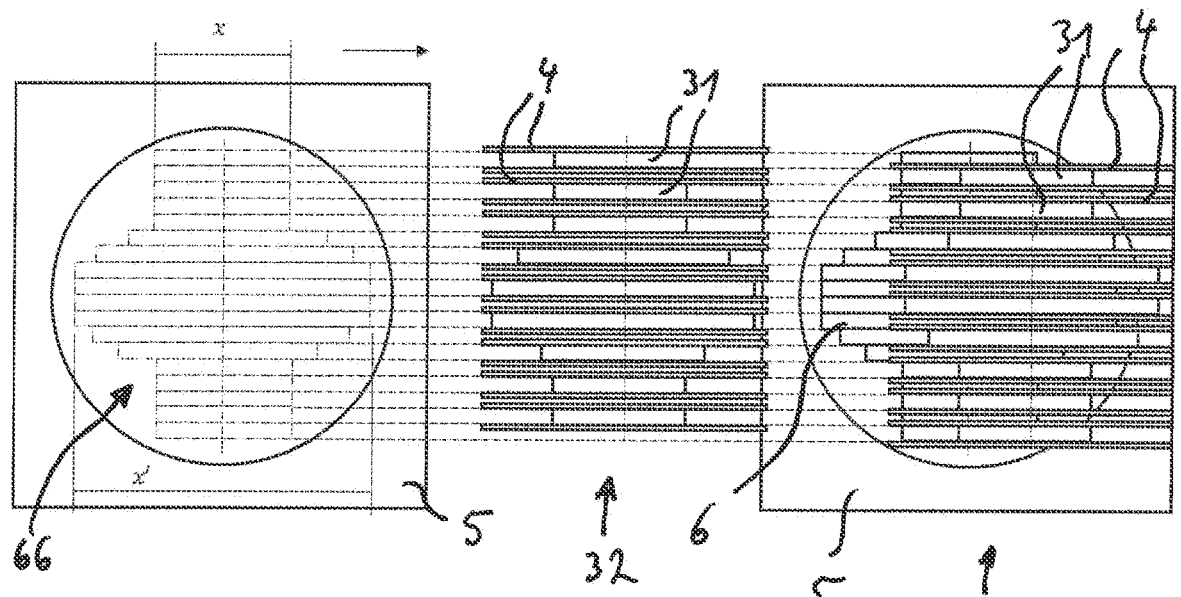
Figure 11:
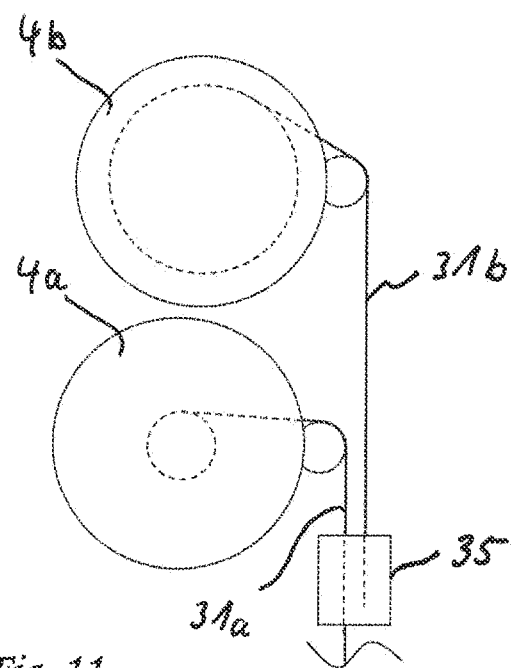
Figure 12:
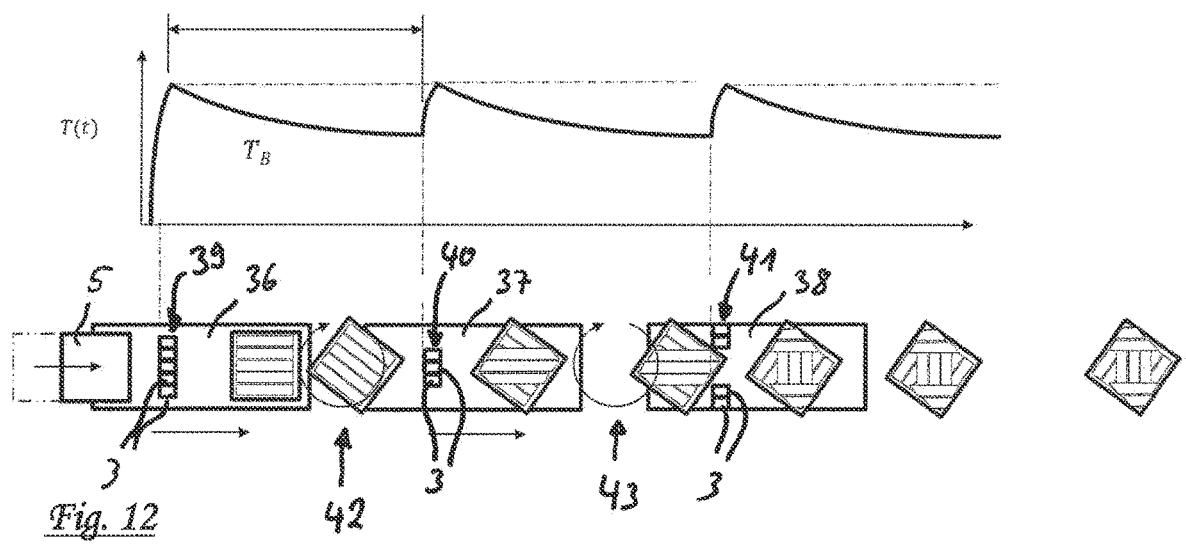
Figure 13:
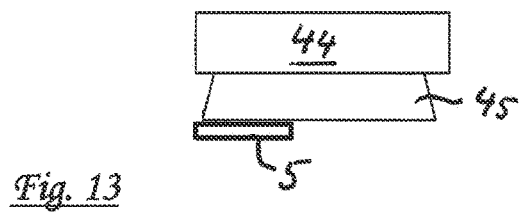
Figure 14:
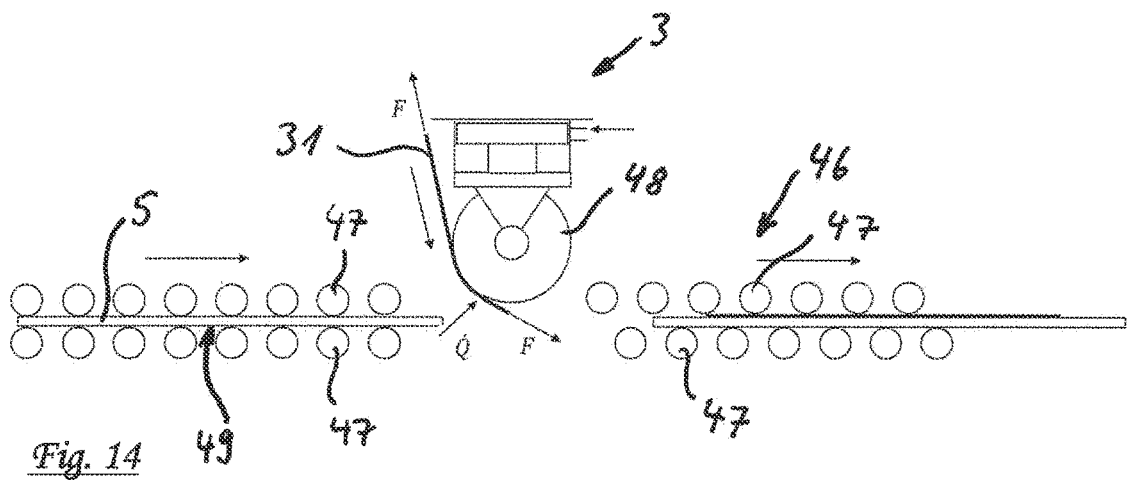
Figure 15:
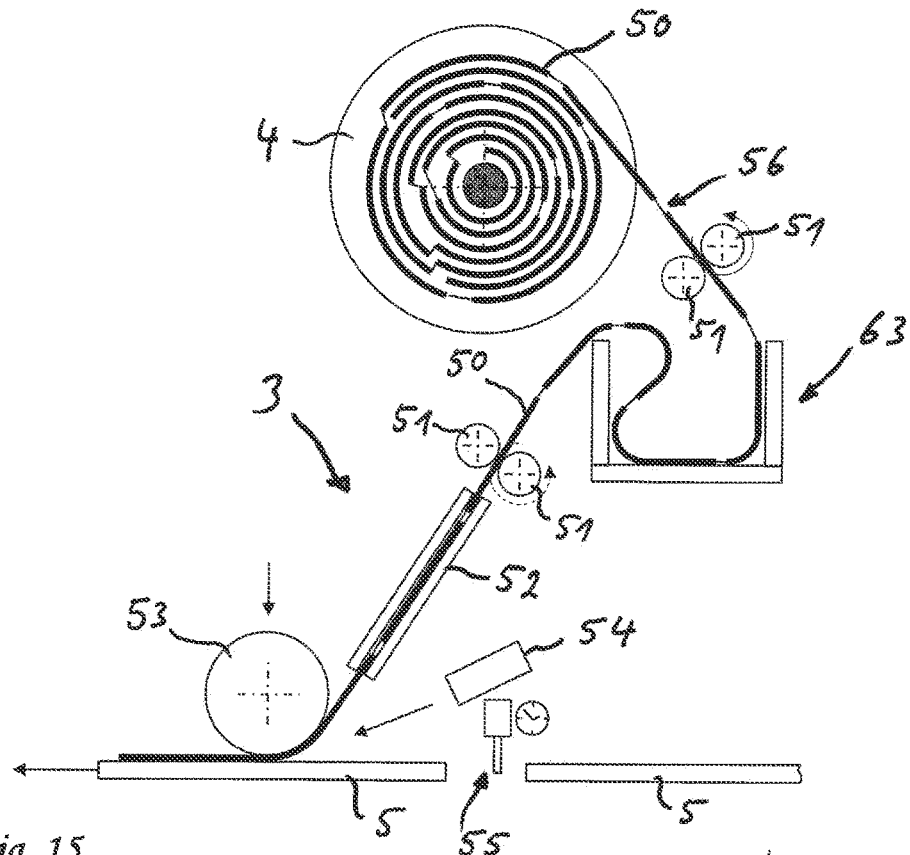
Figure 16:
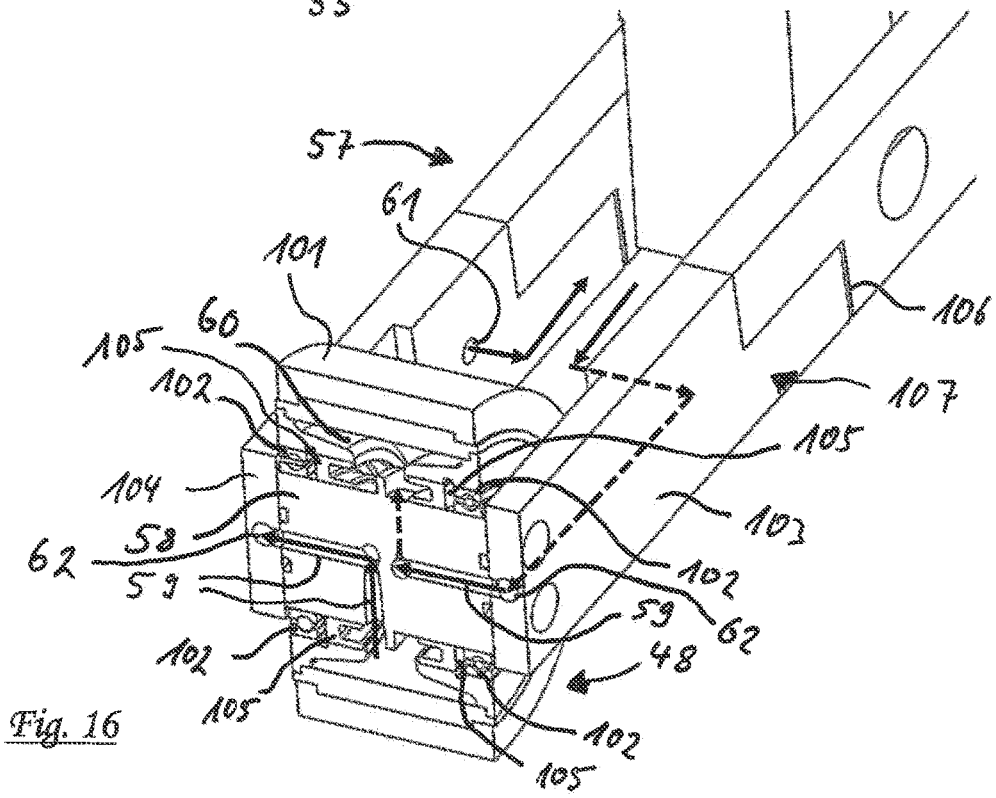
Figure 17:
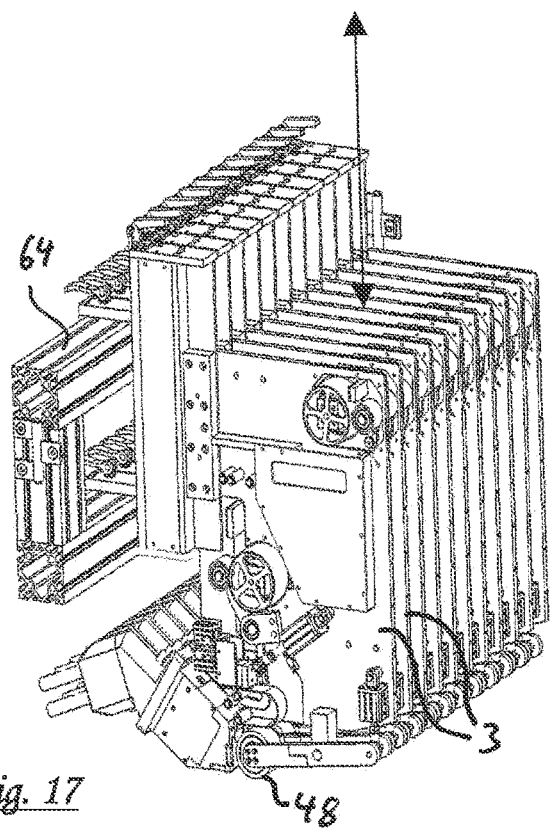
Figure 18:
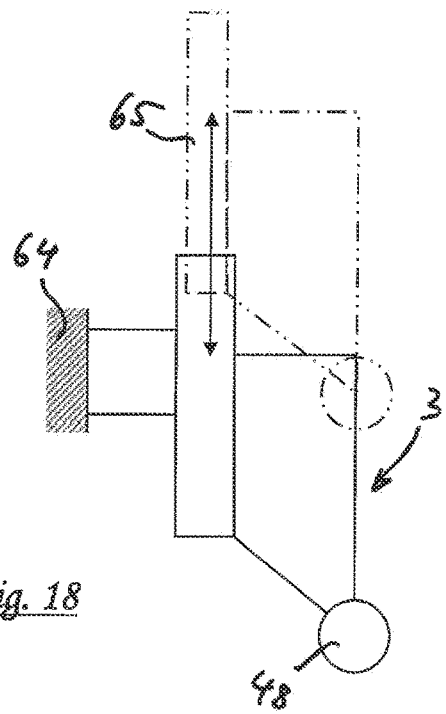
Figure 19:
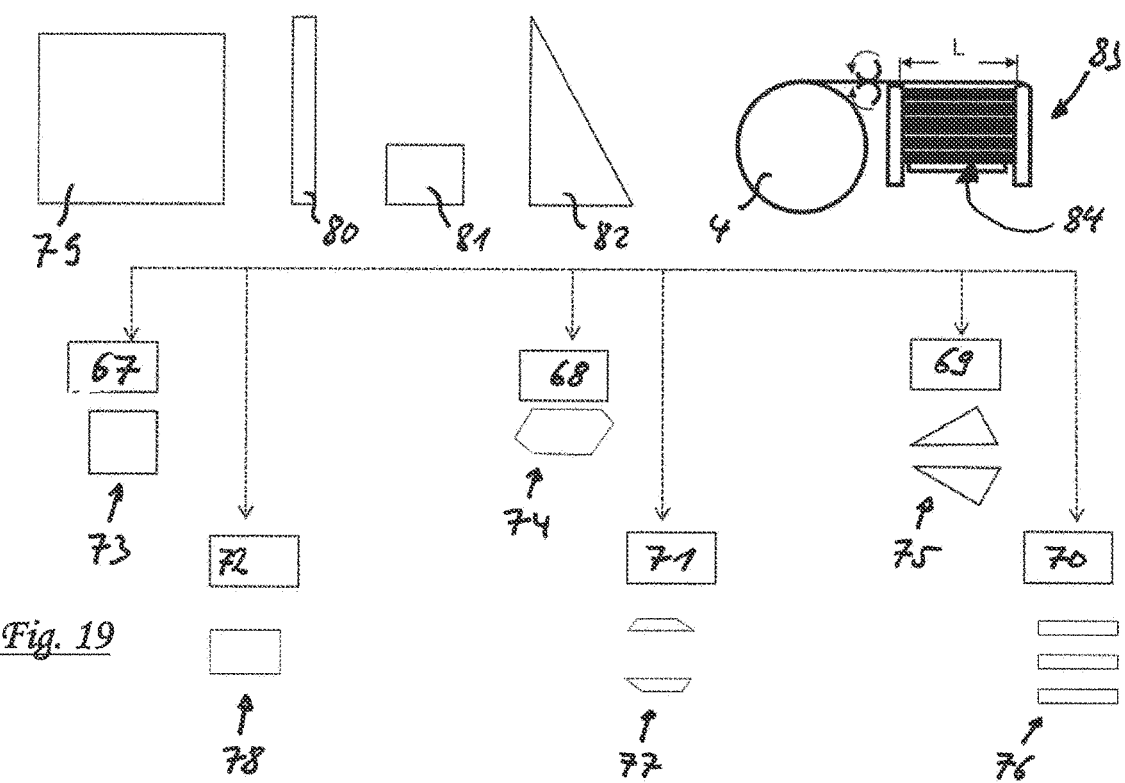
Figure 20:
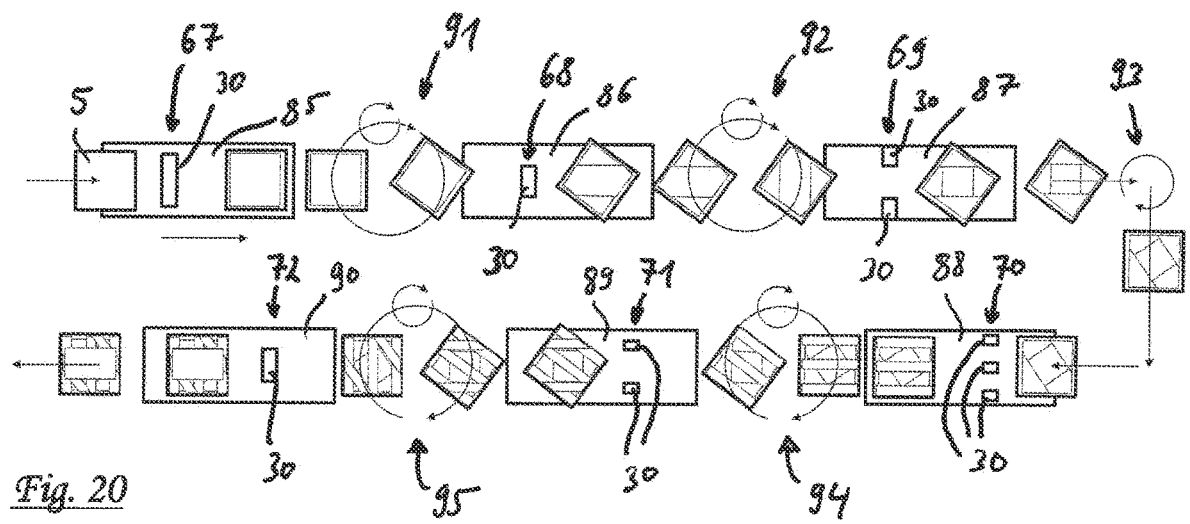
Figure 21:
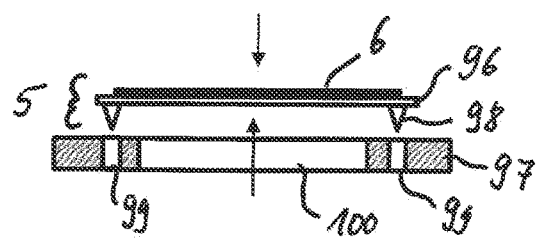
Figure 22:
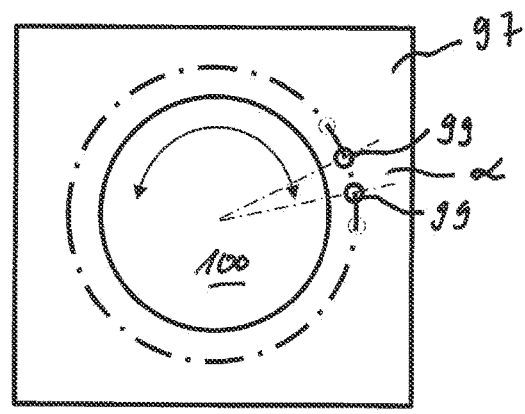

FIG. 1: shows a first production device with an application station in top view, FIG. 2: shows the production device according to FIG. 1 in side view, FIG. 3: shows a second production device with a plurality of application stations in top view, FIGS. 4-9: show different distribution plans for laying sites of an application station, FIG. 10: shows a schematic illustration of an optimized configuration of supply reels, FIG. 11: shows two supply reels with strips to be joined to one another, FIG. 12: shows a third production device with a tempering unit, FIG. 13: shows a tempering unit, FIG. 14: shows part of a laying unit with pressure-exerting roller and adjacent strip, FIG. 15: shows a laying unit with supply reel and portioned strip, FIG. 16: shows, in partial section, a laying unit, only partly illustrated, with a fluid-cooled pressure-exerting roller, FIG. 17: shows an arrangement of a plurality of laying units on a retaining framework, FIG. 18: shows a laying unit on a retaining framework, FIG. 19: shows a sequence diagram for a production method, FIG. 20: shows a production device for the sequence diagram according to FIG. 19, FIG. 21: shows a base unit and a retaining element in side view, and FIG. 22: shows the retaining element according to FIG. 21 in top view.

FIG. 1 shows schematically in top view and FIG. 2 in side view a conveyor subunit 1 of a conveyor device (not illustrated entirely here) of a first production device with an application station 2. For the application station 2, the top view in FIG. 1 illustrates a multiplicity of laying units 3 (only two of which are provided with reference signs) which are supplied with strip material, not illustrated here, by supply reels 4 (only two of which are provided with reference signs). A plurality of base units 5 are illustrated in various phases of the processing. At the top on the left in FIG. 1, the base unit 5 with already applied strips 6 of differing length of a first deposition layer is located in a first stacking device 7. In the side view in FIG. 2, the base units 5 have not yet been provided with strips 6 before entering into the application station 2. A strip 6 of a first deposition layer is indicated only on the right of the application station 2. The stacking device 7 permits a stack of base units 5 to be received on a first carrier element 8.

In addition, the first stacking device 7 has a rotation device 12, which is symbolized here only by arrows, with which the carrier element 8 and thus the entire stack of the base units 5 can be rotated in order to provide the stack and thus the uppermost base unit 5 with a certain orientation before entry into the application station 2. The first stacking device 7 thus serves simultaneously as the orientation unit 11. After leaving the application station 2, the base unit 5 is supplied to a second stacking device 9 in which, in turn, the base units 5 can be received in a stack on a second carrier element 10.

After leaving the application station 2, the base units 5 can be returned from the second stacking device 9 by a second conveyor subunit, not illustrated here, to the first stacking device 7 in order, after a possibly changed orientation, to be covered again in the application station 2 with strips 6. Accordingly, the base units 5 to the right of the application station 2 in FIG. 1 already show strips 6 of a second deposition layer. This cycle can be carried out as often as desired when required. The transport from the second stacking device 9 to the first stacking device 7 is preferably undertaken here in an automated manner by means of the conveyor device, not illustrated further in detail.

However, from the second stacking device 9, the base units 5 can also be supplied to further applications, i.e. to a further application station, not illustrated in FIGS. 1 and 2, or to other measures, such as, for example, trimming or tempering.

The stacking devices 7 or 9 for the base units 5 have the advantage that they can be used as buffers in the production sequence. In principle, the orientation of the base units 5 before entry into the application station 2 can, however, also take place individually in each case at the base units 5 by other orientation measures that are not illustrated here. Stacking is not required.

FIG. 3 shows in top view a second production device, which is configured as a production line, in top view and shows the coverage of a base unit 5 with a plurality of layers of strips 6. The base unit 5 which is not yet covered with strips 6 (at the top on the left in the figure) is guided by means of a first conveyor subunit 13 through a first application station 14 where it is covered with a first deposition layer of strips 6. The base unit 5 is subsequently rotated about a certain angle in a first orientation unit 15, symbolized merely by rotation arrows, with an axis of rotation perpendicular to the conveying plane. The base unit 5 is supplied by means of a second conveyor subunit 16 to a second application station 17 and provided with a second deposition layer of strips 6. This scheme is continued via a second orientation unit 18, a third conveyor subunit 19, a third application station 20, a third orientation unit 21, a fourth conveyor subunit 22 and a fourth application station 23, a fourth orientation unit 24, a fifth conveyor subunit 25, a fifth application station 26, a fifth orientation unit 27 and a sixth conveyor subunit 28 with a sixth application station 29 such that ultimately the strips 6 are present on the base unit 5 in six deposition layers.

FIG. 3 can be understood as depicting the sequence of treatment steps of one and the same base unit 5. Of course, the schematic illustration according to FIG. 3 also illustrates the production device with a multiplicity of base units 5 in the various stations.

According to the illustration in FIG. 3, the various application stations 14, 17, 20, 23, 26 and 29 each have different arrangements of laying sites 30 for the strips 6, of which in each case only one is provided with a reference sign. The laying site 30 is understood as meaning the site at which the strip material is pressed onto the base unit 5 by means of a pressure-exerting roller, also not illustrated here. With the different distribution of the laying sites 30, each deposition layer in the second production device according to FIG. 3 has a different laying pattern of the laid strips 6.

However, it can also be desirable for the strips that are to be laid in an application station to at least partially butt against one another at their edges, thus resulting in a closed layer which exceeds the width of the individual strips. FIGS. 4 to 9 show different possibilities of arranging laying sites 30 on the respective conveyor subunit 1, of which laying sites only two are provided with reference signs in the figures for better clarity. A respective base unit 5 is shown on the left in the figures, and also in a previous orientation by broken lines in FIG. 4. At the right end of the conveyor subunit 1, the respective base unit 5 is illustrated with strips 6 (only two of the seven strips with reference signs) applied at the laying sites 30.

By means of the laying sites 30 being offset in the conveying direction, the associated laying units, not illustrated here, can be configured to be wider than the width of the strip that is to be laid, which has considerable simplifications in respect of the design of the laying units.

Furthermore, the offset arrangement of laying sites 30 permits lateral access to the laying units 3 (not illustrated in FIGS. 4 to 9), for example for the purpose of maintenance, repair or exchange.

FIG. 10 shows a base unit 5 schematically on the left side and thereon by broken lines a laying pattern 66 of strips 6 that are to be laid, as is realized on the right in the depiction of the base units after laying of the strips 6. The laying pattern 66 is not a square area but rather provides regions with strips 6 of differing length (e.g. x and x'). In order to be able to lay the strips 6 butting against one another, laying sites 30 (not illustrated in FIG. 10) that are arranged offset with respect to one another are provided, similarly to the arrangement in FIG. 8. A respective laying unit, not illustrated in FIG. 10, which is supplied with strip material 31 by means of supply reels 4 belongs at each laying site 30. A multiplicity of supply reels 4 are arranged next to one another in each case in a first series of reels 32 and a second series of reels 33. The supply reels 4 are also arranged offset with respect to one another in the two series of reels 32 and 33 in accordance with the laying sites provided offset with respect to one another (compare laying sites 30 in FIG. 8) for the strip material 31. A tight deposition layer with strips 6 butting against one another is thereby achieved.

The supply reels 4 have different quantities of strip material 31. The quantity of strip material 31 in the central supply reels 4 of the series of reels 32 and 33 is substantially higher than in the supply reels 4 arranged at the respective edge. The quantity of strip material 31 present in the supply reels 4 is in each case adapted here to the strip pattern that is to be laid and is selected in such a manner that, during the planned laying of the strips 6, the supplies of the strip material 31 in all of the reels 4 end at the same time. This has the advantage that the supply reels 4 can all be exchanged simultaneously without significant residues of strip material 31 still remaining in one of the reels 4.

In order to be able to carry out an exchange of supply reels 4 without having to interrupt the production process or being able to keep the interruption as small as possible, the strip material 31 of two different supply reels 4 can be joined together by the method illustrated in FIG. 11. FIG. 11 shows a first supply reel 4a whose supply of strip material 31a is at an end. Above the first supply reel 4a there is a second supply reel 4b whose supply of strip material 31b is still complete. The respective strip material 31a and 31b is supplied via deflecting rollers 34a and 34b to a joining device 35 in which the strip materials 31a and 31b are joined together. A possibly arising thickening of the strip material during the joining can be cut off during the laying operation or ignored. Starting from the variant illustrated in FIG. 10, the exchange of the supply reels 4 can be carried out for all of the reels 4 of the series of reels 32 or 33 since the reels 4 of the series of reels 32 or 33 are used up substantially simultaneously.

FIG. 12 schematically shows a third production device with three conveyor subunits 36, 37, 38 each having an application station 39, 40, 41 with different arrangements of the laying units 3. Respective orientation units 42 and 43, symbolized merely by rotation arrows, for orienting the base units 5 are arranged between the conveyor subunits 36, 37, 38. Between the application stations 39, 40 and 41, a respective tempering arrangement 44 (not illustrated in FIG. 12) is provided above the conveying plane such that the temperature of the base unit 5 drops only slightly on the conveyor path between the application stations 39, 40 and 41. One of the tempering arrangements 44 which acts on the base unit 5 by means of thermal radiation 45, for example infrared light, is shown schematically in FIG. 13. Other heating variants are likewise possible, such as, for example, inductive heating or resistance heating of a carrier part of the base unit 5, hot gas or a photonic heating source. Therefore, in the respectively following application station, for example 40 or 41, the time required for the necessary heating can be kept small. Above the third production device, a diagram having an exemplary profile of the temperature $T_B$ in the base unit 5 is illustrated in idealized form without the action of one or more tempering arrangements 44 by a solid line and with the influence of the tempering by a broken line.

FIG. 14 shows schematically a conveyor subunit 46 with base units 5 conveyed thereon by means of conveyor rollers 47. Strip material 31 is supplied to a pressure-exerting roller 48 of a laying unit 3, not illustrated entirely here, said strip material being provided for depositing on the base unit 5 coming from the left. The pressure-exerting roller 48 is accessible from below the conveying plane 49 provided by the lower side of the base unit, in order to enable an application of heat dQ/dt to the strip material 31 present at the pressure-exerting roller 48 and also to lay the strip material 31 onto the pressure-exerting roller 48. The strip material 31 is preferably laid in a targeted manner at a location of the pressure-exerting roller 48 that comes together with the starting point of the desired depositing of the strip on the base unit 5 during the rolling of the pressure-exerting roller 48. For the laying of the strip material 31 onto the pressure-exerting roller 48 a press-on element, not illustrated here, can be used.

FIG. 15 schematically illustrates a laying unit 3 which is supplied with strip material 50 by a supply reel 4. The strip material 50 is conveyed by means of pairs of drive rollers 51, of which preferably only in each case one is actively driven, via a guide unit 52 to a pressure-exerting roller 53 which lays the strip material 50 onto the front one of the two illustrated base units 5 in the conveying direction. The strip material 50 is heated directly before being laid by means of a photonic heating unit 54, for example a laser. Base units 5 conveyed with respect to the pressure-exerting roller 53 are detected by a proximity sensor 55 which can furthermore serve for controlling the pressure-exerting force (symbolized by an arrow) of the pressure-exerting roller 53 to the base unit 5, for example via a pneumatic cylinder, not illustrated here, and/or for controlling the heating unit 54. The pressure-exerting roller 53 is formed elastically on its circumference in order to be able to compensate for surface irregularities at the base unit 5.

The strip material 50 is guided via a buffer region 63 which decouples the advancing of the strip material 50 toward the pressure-exerting roller 53 from the mass inertia of the supply reel 4.

The strip material 50 is cut in advance into strip material pieces which are joined together loosely at contact points 56 forming predetermined separating points, for example by means of a binder that melts below the melting point of the plastics matrix of the strip material 50. Other mechanisms, for example a perforation, the resting of the strip material pieces on a backing material or the connection of the strip material pieces by means of easily releasable connecting elements, are likewise conceivable. The complexity of a cutting process within the laying unit 3 can thereby be avoided. The strip material pieces can also be separated from one another by means of the photonic heating unit 54.

FIG. 16 shows, partially in perspective and partially in section, a pressure-exerting roller 48 which is arranged between two lever arm sections 103 and 104 on a pivotable lever element 57 and has a casing element 101 provided for contact with strip material that is to be laid. The pressure-exerting roller 48 is mounted with bearings 102 on an axle 58 which is fixed on the lever arm sections 103 and 104. A ball bearing is indicated in FIG. 16. Of course, other types of bearings, such as roller bearings or plain bearings, are likewise possible. The arrangement of the bearings 102 within a working width of the pressure-exerting roller 48, said working width being predetermined by the width of the casing element 101, i.e. between the lever arm sections 103 and 104 in the example illustrated here of FIG. 16, leads to the width of the lever element 57 not being increased by means of the bearings 102, as a result of which a more compact construction with adjacent laying units is possible.

The fixed axle 58 has bores 59 through which a cooling fluid can be guided into a chamber 60 encircling the axle 58. The chamber 60 is sealed in relation to the bearings 102 by seals 105. The cooling fluid, the course of which is symbolized by arrows, can be fed in via an inlet (not visible here) arranged on the lever arm section 103 and can be guided to the static axle 58 via lever arm bores 62. The cooling fluid leaves the lever element 57 via an outlet 61 on the lever arm section 104. A front part 107 of the lever element 57 can be removed together with the pressure-exerting roller 48 via a partition 106 for the purpose of repair, maintenance or exchange.

FIG. 17 shows a parallel arrangement of a plurality of laying units 3 which are held on a retaining framework 64 and each have a pressure-exerting roller 48, in a perspective view. Such an arrangement can be provided in an application station. The individual elements of the laying units 3, which elements are basically known from the prior art and can be seen in FIG. 17, will not be discussed in more detail here. FIG. 18 merely shows schematically in side view one of the laying units 3 on the retaining framework 64. The laying unit 3 is arranged on a movable rail 65 which permits a motor-driven or manual movement of the laying unit 3 upward or downward relative to the retaining framework 64. This facilitates possibly necessary maintenance or repair work and exchange of the laying unit 3. For better accessibility to the individual laying unit 3, an alternative to the movement up and down would be a pivoting movement about a pivot axis that is arranged on the retaining framework 64 and is not illustrated here.

FIG. 19 shows schematically the sequence of an example of the method according to the invention. Different laying patterns 73 to 78 are laid in application stations 67 to 72. For this purpose, different arrangements of laying units, not illustrated here, or only an individual laying unit are or is provided in each application station 67 to 72, specifically in such a manner that, during each pass of base units, likewise not illustrated here, each of the laying units becomes active, and therefore optimized utilization of the laying units is provided. It is thus possible for a single laying unit to be provided in application station 67, said laying unit laying a very wide strip, as is symbolized by the strip piece 79. By contrast, strip piece 80 is narrow and represents strips that are to be laid in application station 70 for the pattern 76. Strips according to the strip pattern 81 could be laid in application station 72.

Triangular strip structures, as shown by strip pattern 82, can also be used, for example in application station 69 for the laying pattern 75. Triangular strip patterns or strip patterns 82 formed in another way can basically be supplied as endless material, for example on a backing material. However, all the strip patterns can also be supplied to the laying units as ready-trimmed strip pieces, for example via a magazine 83 which obtains the trimmed strip pieces (present there in stack 84) from a supply reel 4 and optionally via a trimming point, not illustrated here.

FIG. 20 shows the method illustrated in FIG. 19 with a top view of the associated production device. The base units 5 coming from the left pass through the application stations 67 to 72 with the associated conveyor subunits and orientation units 91 to 95. The laying patterns laid in the respective position of the strips at the laying sites 30 substantially correspond to the laying patterns 73 to 78 of FIG. 19.

FIG. 21 and FIG. 22 finally show a main base unit 96 with a strip 6 laid thereon, and a retaining element 97 for the main base unit. Base main unit 95 and strip 6 together form a base unit 5 within the meaning of the invention. The main base unit 96 has latching means 98, here by way of example in the form of spikes, which engage in bores 99 of the retaining element 97. Adjacent bores 99, of which only two are clearly illustrated in FIG. 22, but which are distributed uniformly in a circle, together with the center point of the retaining element 97 form an angle α about which the main base unit 96 can latch in an offset manner into the retaining element 97. The retaining element 97 has a central bore 100 through which orientation means, not shown here, of an orientation unit can grip the main base unit 96 in order to be able to carry out a change in orientation.

LIST OF REFERENCE SIGNS

1 Conveyor subunit
2 Application station
3 Laying unit
4 Supply reel
5 Base unit
6 Strip
7 First stacking device
8 First carrier element
9 Second stacking device
10 Second carrier element
11 Orientation unit
12 Rotation device
13 First conveyor subunit
14 First application station
15 First orientation unit
16 Second conveyor subunit
17 Second application station
18 Second orientation unit
19 Third conveyor subunit
20 Third application station
21 Third orientation unit
22 Fourth conveyor subunit
23 Fourth application station
24 Fourth orientation unit
25 Fifth conveyor subunit
26 Fifth application station
27 Fifth orientation unit
28 Sixth conveyor subunit
29 Sixth application station
30 Laying sites
31 Strip material
32 First series of reels
33 Second series of reels
34 Deflecting rollers
35 Joining device
36 Conveyor subunit
37 Conveyor subunit
38 Conveyor subunit
39 Application station
40 Application station
41 Application station
42 Orientation unit
43 Orientation unit
44 Tempering arrangement
45 Thermal radiation
46 Conveyor subunit
47 Conveyor rollers
48 Pressure-exerting roller
49 Conveying plane
50 Strip material
51 Drive roller
52 Guide unit
53 Pressure-exerting roller
54 Heating unit
55 Proximity sensor
56 Contact point
57 Lever element
58 Axle
59 Bore
60 Chamber
61 Cooling fluid outlet
62 Lever arm bore
63 Buffer region
64 Retaining framework
65 Rail
66 Laying pattern
67 Application station
68 Application station
69 Application station
70 Application station
71 Application station
72 Application station
73 Laying pattern
74 Laying pattern
75 Laying pattern
76 Laying pattern
77 Laying pattern
78 Laying pattern
79 Strip pattern
80 Strip pattern
81 Strip pattern
82 Strip pattern
83 Magazine
84 Stack
85 Conveyor subunit
86 Conveyor subunit
87 Conveyor subunit
88 Conveyor subunit
89 Conveyor subunit
90 Conveyor subunit
91 Orientation unit
92 Orientation unit
93 Orientation unit
94 Orientation unit
95 Orientation unit
96 Main base unit
97 Retaining element
98 Latching means
99 Bores
100 Central bore
101 Casing element
102 Bearing
103 Lever arm section
104 Lever arm section
105 Seal
106 Partition
107 Front part of the lever element

The invention claimed is:

1. A method for producing workpieces comprising fiber composite material, comprising:
 a) guiding a base unit held by retaining means of a conveyor device through an application station,
 b) forming the workpieces at the application station during a translational movement of the base unit along a conveying plane of the conveyor device through the application station, wherein forming the workpieces comprises laying at least one strip belonging to the fiber composite material onto the base unit, wherein the at least one strip is laid onto the base unit with at least one laying unit, wherein the at least one laying unit is stationary relative to the application station, c) changing the spatial orientation of the base unit to a second orientation by means of at least one rotation about an axis of rotation perpendicular to the conveying plane and relative to the retaining means in the conveying direction, and d) further forming the workpieces by either:

removing the base unit from the retaining means prior to changing the spatial orientation, and then laying at least one second strip belonging to the fiber composite material on the base unit during a second conveyance through the application station with the base unit in the second orientation; or laying the at least one second strip belonging to the fiber composite material on the base unit during conveyance through a second application station with the base unit in the second orientation.

2. The method as claimed in claim 1, characterized in that the change in spatial orientation takes place while the base unit is being conveyed on the conveyor device.

3. The method as claimed in claim 1, characterized in that the base unit in the conveyor device is acted upon with heat at least also outside the application station.

4. The method as claimed in claim 1, characterized in that a strip material for forming the at least one strip is kept ready in at least one supply container.

5. The method as claimed in claim 4, wherein the at least one supply container comprises at least two supply containers, and further comprising loading the application station with at least two of the at least two supply containers in order to exhaust said supply containers simultaneously or at least approximately simultaneously during a planned strip deposition with a predetermined laying pattern.

6. The method as claimed in claim 4, wherein the at least one supply container comprises at least two supply containers, and further comprising, before a first of the at least two supply containers is replaced by a second of the at least two supply containers, joining the strip material of the second supply container to the strip material of the first supply container.

7. The method as claimed in claim 4, further comprising dividing, by means of predetermined separating points, at least a partial quantity of the strip material into a plurality of strip material sections which are easily separable from one another and wherein the length of each of the plurality of strip material sections corresponds precisely or at least substantially to the length of the at least one strip to be formed therewith.

8. The method as claimed in claim 4, characterized in that at the application stations for laying the at least one strips, the strip material is pressed against the base unit by a respective pressure element of the at least one laying unit.

9. The method as claimed in claim 8, characterized in that before the strip material is pressed against the base unit, the strip material is acted upon from a region spaced apart from the pressure element in the pressure direction of the pressure element, and wherein the strip material is pre-positioned, pretreated, preheated, and/or attached to the pressure element in question before contact with the base unit.

10. The method as claimed in claim 8, characterized in that the pressure element is cooled by means of a cooling fluid flowing through the pressure element.

11. The method as claimed in claim 1, characterized in that at least two base units are conveyed simultaneously in the conveyor device and the at least two base units are guided successively through at least the application station and the second application station, wherein at least the application station and the second application station, different laying patterns of the at least one strip and at least one second strip are provided.

12. A method for producing workpieces comprising fiber composite material, comprising:

a) guiding a base unit held by retaining means of a conveyor device on a first conveyance through a first application station in a conveying direction, b) forming the workpieces at the first application station during a translational movement of the base unit on the first conveyance through the first application station, wherein forming the workpieces comprises laying at least one strip belonging to the fiber composite material onto the base unit, and c) subsequent to laying the at least one strip belonging to the fiber composite material onto the base unit, changing the spatial orientation of the base unit to a second orientation by means of at least one rotation relative to the retaining means, d) further forming the workpieces by either:

removing the base unit from the retaining means prior to changing the spatial orientation, and then laying at least one second strip belonging to the fiber composite material on the base unit during a second conveyance through the first application station with the base unit in the second orientation; or laying the at least one second strip belonging to the fiber composite material on the base unit during conveyance through a second application station with the base unit in the second orientation.

\* \* \* \* \*